(12) United States Patent
Kim et al.

(10) Patent No.: US 7,486,970 B2
(45) Date of Patent: Feb. 3, 2009

(54) MOBILE TERMINAL AND SYSTEM FOR PROVIDING TOTAL STATUS INFORMATION THEREOF AT ONE TIME

(75) Inventors: Yu-Jin Kim, Suwon-si (KR); Sung-Jo Oh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 741 days.

(21) Appl. No.: 10/865,511

(22) Filed: Jun. 10, 2004

(65) Prior Publication Data
US 2005/0096094 A1    May 5, 2005

(30) Foreign Application Priority Data
Nov. 3, 2003   (KR)   ................ 10-2003-0077341

(51) Int. Cl.
*H04Q 7/32* (2006.01)
*H04Q 7/20* (2006.01)
(52) U.S. Cl. ................ 455/566; 455/550.1; 455/414.1; 455/412.1; 455/412.2; 455/422.1; 709/213; 709/214; 709/217; 709/203; 709/224; 379/433.01
(58) Field of Classification Search .................. 455/566, 455/550.1, 412.1, 412.2, 445, 422.1, 403, 455/414.1, 414.3, 418, 419, 420, 500, 517, 455/426.1, 426.2, 502, 90.1, 90.3, 575.1; 709/213, 214, 217, 203, 201, 224, 226, 228, 709/229; 379/433.01, 433
See application file for complete search history.

(56) References Cited

U.S. PATENT DOCUMENTS

| 5,852,783 | A | * | 12/1998 | Tabe et al. ................ 455/566 |
| 5,915,225 | A | | 6/1999 | Mills |
| 6,490,465 | B1 | * | 12/2002 | Mittelstadt et al. ............ 455/566 |
| 6,546,263 | B1 | | 4/2003 | Petty et al. |
| 6,671,508 | B1 | * | 12/2003 | Mitsuoka et al. .......... 455/412.1 |
| 2002/0120681 | A1 | * | 8/2002 | Cho et al. ................... 709/203 |
| 2002/0197983 | A1 | | 12/2002 | Chubb et al. |
| 2003/0008686 | A1 | | 1/2003 | Park et al. |
| 2003/0083047 | A1 | | 5/2003 | Phillips et al. |
| 2005/0202805 | A1 | * | 9/2005 | Chubb et al. ............. 455/414.2 |

FOREIGN PATENT DOCUMENTS

EP         1 154 619       11/2001

* cited by examiner

*Primary Examiner*—Keith T Ferguson
(74) *Attorney, Agent, or Firm*—The Farrell Law Firm, PC

(57) ABSTRACT

A mobile terminal is disclosed having a controller responsive to a status information display command inputted for detecting status information stored in a storage unit and displaying all of the status information at one time via a display unit. A system is disclosed having an Internet connected computer for generating a status information request signal in response to an input command, sending the generated status information request signal over the Internet, receiving information corresponding to the status information request signal over the Internet and displaying the received information. The mobile terminal stores the status information in the form of a table, and detects and transmits the information in response to the status information request signal sent from the user computer. A Web server is disclosed for transferring the status information request signal and the status information between the mobile terminal and computer.

10 Claims, 6 Drawing Sheets

| CONTENTS | INFORMATION |
|---|---|
| TOTAL CALL TIME | 1234 MINUTES |
| THIS MONTH'S TOTAL CALL TIME | 500 MINUTES |
| NUMBER OF MESSAGES IN SENT MESSAGE BOX | 20 |
| NUMBER OF MESSAGES IN RECEIVED MESSAGE BOX | 40 |
| NUMBER OF STORED BACKGROUND PICTURES AND LIST OF TITLES THEREOF | 5 |
| NUMBER OF STORED MELODIES AND LIST OF TITLES THEREOF | 3 |
| NUMBER OF INPUT TELEPHONE NUMBERS | 200 |
| NUMBER OF TELEPHONE NUMBERS TO BE SPECIALLY MANAGED FOR CALL TERMINATION AND LIST THEREOF | 20 |
| NUMBER OF KARAOKE ROOMS AND LIST OF TITLES THEREOF | 5 |
| NUMBER OF CONTENTS DOWNLOADED INTO LAND BOX AND LIST OF TITLES THEREOF | 3 |
| NUMBER OF REGISTERED SCHEDULES AND LIST OF TITLES THEREOF | 30 |
| NUMBER OF REGISTERED MEMOS | 2 |
| ALARM SETTING (TIME, ALARM SOUND TYPE) | ALARM 1 : 3:42 P.M., : CAVATINA<br>ALARM 2  RESONANT SOUND |
| BELL/VIBRATION SETTING (VIBRATION, MELODY, LED) | MELODY (MUSIC BELL) |
| TOTAL MEMORY CAPACITY AND CURRENTLY USED MEMORY CAPACITY | 10MB/32MB |

FIG.2

| CONTENTS | | INFORMATION |
|---|---|---|
| TOTAL CALL TIME | | 1234 MINUTES |
| THIS MONTH'S TOTAL CALL TIME | | 500 MINUTES |
| NUMBER OF MESSAGES IN SENT MESSAGE BOX | | 20 |
| NUMBER OF MESSAGES IN RECEIVED MESSAGE BOX | | 40 |
| NUMBER OF STORED BACKGROUND PICTURES AND LIST OF TITLES THEREOF | | 5 |
| NUMBER OF STORED MELODIES AND LIST OF TITLES THEREOF | | 3 |
| NUMBER OF INPUT TELEPHONE NUMBERS | | 200 |
| NUMBER OF TELEPHONE NUMBERS TO BE SPECIALLY MANAGED FOR CALL TERMINATION AND LIST THEREOF | | 20 |
| NUMBER OF KARAOKE ROOMS AND LIST OF TITLES THEREOF | | 5 |
| NUMBER OF CONTENTS DOWNLOADED INTO LAND BOX AND LIST OF TITLES THEREOF | | 3 |
| NUMBER OF REGISTERED SCHEDULES AND LIST OF TITLES THEREOF | | 30 |
| NUMBER OF REGISTERED MEMOS | | 30 |
| ALARM SETTING | ALARM 1 | ALARM 1 : 3:42 P.M., : CAVATINA |
| | ALARM 2 | 7:00 A.M : RESONANT SOUND |
| BELL/VIBRATION SETTING (VIBRATION, MELODY, LED) | | MELODY (MUSIC BELL) |
| REMAINING BATTERY POWER | | 3 BLOCKS |
| TOTAL MEMORY CAPACITY AND CURRENTLY USED MEMORY CAPACITY | | 10MB/32MB |
| RECEIVED TIME OF THE STATE INFORMATION REQUEST | | 1 MINUTE |

FIG.7

MOBILE TERMINAL AND SYSTEM FOR PROVIDING TOTAL STATUS INFORMATION THEREOF AT ONE TIME

PRIORITY

This application claims priority to an application entitled "MOBILE TERMINAL AND SYSTEM FOR PROVIDING TOTAL STATUS INFORMATION THEREOF AT ONE TIME", filed in the Korean Intellectual Property Office on Nov. 3, 2003 and assigned Serial No. 2003-77341, the contents of which are hereby incorporated by reference.

BACKGROUND OF THE INVENTION

1. Field of the Invention

The present invention relates to a system for providing status information of a mobile terminal, and more particularly to a system for providing status information of a mobile terminal.

2. Description of the Related Art

As mobile communication services are diversified, mobile terminals capable of performing with various service functions are being introduced to the market. In order to confirm the current status information of such mobile terminals, a user has to search various menus to find a menu providing the required information. This search is performed one by one, which is troublesome to the user.

Here, the status information of the mobile terminal signifies options set by the user, such as an alarm setting, a schedule setting, a bell/vibration mode (i.e. a vibration mode, light emitting diode (LED) mode, melody-after-vibration mode or melody mode) setting, and a total call time for mobile communication. In order to confirm a desired one of such various status information set in the mobile terminal, the user must search different menus for one set to serve the desired status information, and select from the searched menus. For this reason, there is a problem in that the user cannot confirm the various status information set in the mobile terminal at a glance.

The status information set in the mobile terminal may further include information about the position of the user, remaining battery power, call records and received/sent short messaging service (SMS) message records of the mobile terminal, in addition to the above-listed information.

On the other hand, the mobile terminal conventionally provides a status information display service to display, for a particular service, status information of respective services set, provided or used for respective service menus in a distributed manner. For this reason, it is impossible for the user to confirm or obtain records of services used by the mobile terminal or status information set therein at a glance, resulting in an inconvenience to the user.

A conventional procedure of confirming two types of status information set using the mobile terminal is carried out in the below manner. The two types of status information to be confirmed, described below, are a total call time and an alarm time.

<Status Information Confirmation Procedure>

Menu key selection→Electronic Diary menu selection→Time Management menu selection after scrolling→Total Call Time View menu selection→call time confirmation→Cancel key selection→Cancel key selection→Alarm menu selection→Alarm Setting menu selection→alarm time setting→Confirm key selection→End key selection In order to confirm the status information set in the mobile terminal, the user has to be fully aware of and perform a complex key selection procedure to confirm the set status information, as discussed above.

SUMMARY OF THE INVENTION

Therefore, the present invention has been made in view of the above problems, and it is an object of the present invention to provide a mobile terminal which is capable of simply and conveniently providing service use information and status information set therein.

It is another object of the present invention to provide a system for providing status information of a mobile terminal, which is capable of providing service use information and status information set in the mobile terminal over the Internet in response to a user's request.

In accordance with an aspect of the present invention, the above and other objects can be accomplished by the provision of a mobile terminal comprising: storage means for storing status information of the mobile terminal in the form of a table; display means for displaying all of the status information at one time; key input means for inputting a command to display the status information; and control means responsive to the status information display command inputted from the key input means, for detecting the status information from the storage means and displaying it via the display means.

Preferably, the status information may include information set for an operation of the mobile terminal and service use information about records of services used by the mobile terminal. The set information may include a list and details of items set for the operation of the mobile terminal, and the service use information may include a list and details of service items used by the mobile terminal.

Preferably, the control means may be adapted to, if a signal to select any one item of the status information is inputted from the key input means, detect details of the selected status information item from the storage means and display them via the display means.

In accordance with another aspect of the present invention, there is provided a system for providing status information of a mobile terminal, comprising: a user computer connected to the Internet, the user computer generating a status information request signal in response to an input command to request the status information, sending the generated status information request signal over the Internet, receiving information corresponding to the status information request signal over the Internet and displaying the received information; the mobile terminal adapted for storing the status information in the form of a table and detecting and transmitting the status information in response to the status information request signal sent from the user computer; and a Web server for transferring the status information request signal from the user computer to the mobile terminal and the status information from the mobile terminal to the user computer, respectively.

Preferably, the system may further comprise a short messaging service (SMS) server connected to the Internet, the SMS server receiving the status information request signal transferred from the Web server, creating an SMS message including the received status information request signal and transmitting the created SMS message to the mobile terminal over a wireless network. In this case, the mobile terminal may receive the SMS message transmitted from the SMS server, detect the status information stored therein in response to the status information request signal included in the received SMS message, create an SMS message including the detected status information and transmit the created SMS message to the SMS server. The SMS server may receive the SMS message including the status information transmitted from the mobile terminal, convert the status information into a status information signal and send the converted status information signal to the Web server over the Internet. The Web server may transfer the status information signal sent from the SMS server to the user computer over the Internet.

Preferably, the SMS message including the status information transmitted from the mobile terminal may further include information about a received time of the SMS message transmitted from the SMS server, information about remaining battery power of the mobile terminal and destination address information of the SMS message including the status information.

In a feature of the present invention, status information of a mobile terminal containing information set in the mobile terminal and service use information is managed in one menu item in an integrated manner, so the status information can be readily confirmed. In addition, an SMS server receives a signal to request the status information of the mobile terminal, transferred over the Internet, converts the received status information request signal into an SMS message and transmits the converted SMS message to the mobile terminal. The mobile terminal analyzes the SMS message transmitted from the SMS server to detect status information corresponding to the status information request signal from a storage unit, converts the detected status information into an SMS message and transmits the converted SMS message to the SMS server. The SMS server converts the SMS message transmitted from the mobile terminal into a status information signal and sends the converted status information signal to a user computer. Therefore, a user can readily confirm the status information of the mobile terminal via an external communication device connected to the Internet.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a table showing examples of status information settable in the mobile terminal of FIG. 1;

FIG. 7 is a table showing examples of status information provided from the mobile terminal displayed on the screen of a user computer through the system of FIG. 6.

DETAILED DESCRIPTION OF THE PREFERRED EMBODIMENTS

Figure 1:
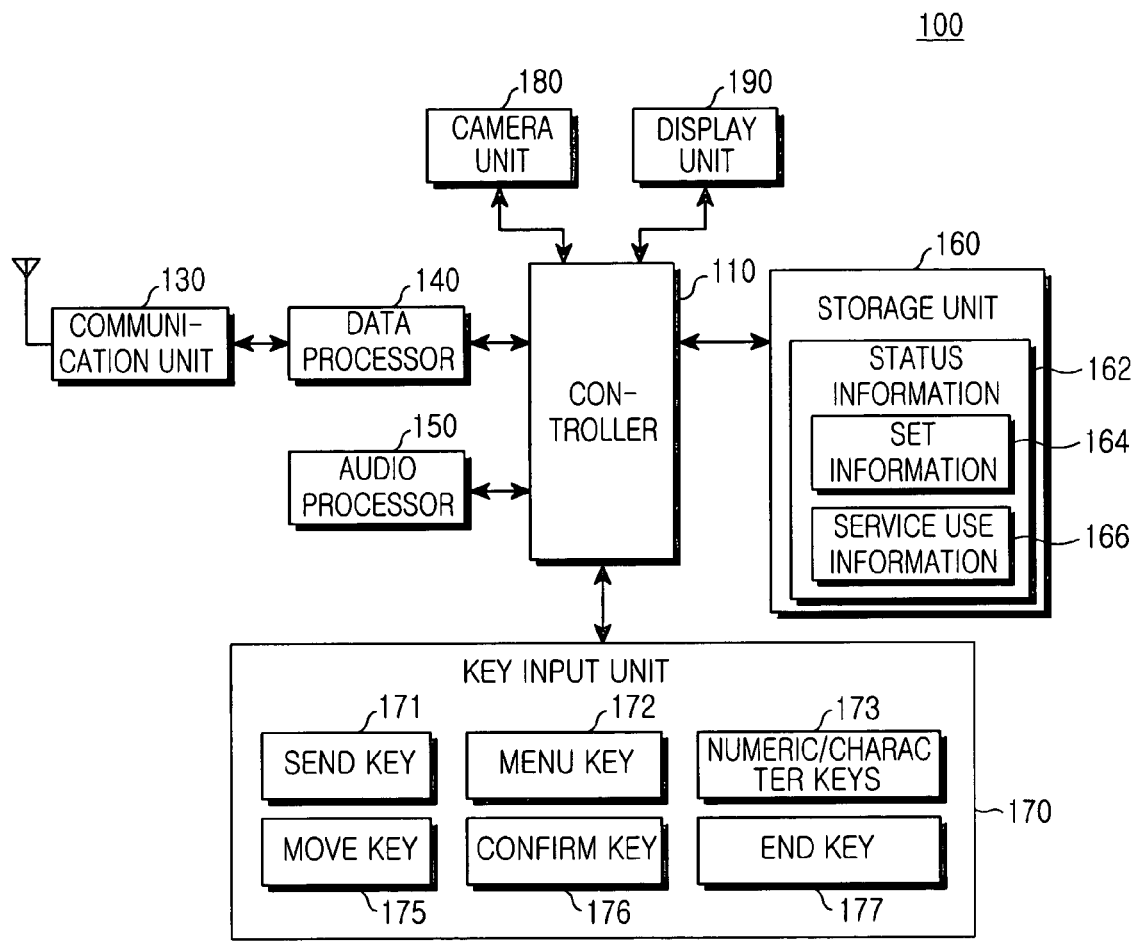
FIG. 1 is a block diagram showing a preferred embodiment of a mobile terminal which provides a simple and convenient status information confirmation service, according to the present invention.

Now, preferred embodiments of the present invention will be described in detail with reference to the annexed drawings. In the drawings, the same or similar elements are denoted by the same reference numerals even though they are depicted in different drawings. In the following description made in conjunction with preferred embodiments of the present invention, a variety of specific elements such as constituent elements of various known circuits are shown. The description of such conventional elements has been made only for a better understanding of the present invention. Those skilled in the art will appreciate that the present invention can be implemented without using the above-mentioned specific elements. In the following description of the present invention, a detailed description of known functions and configurations incorporated herein will be omitted to avoid making the subject matter of the present invention unclear.

With reference to FIG. 1, there is shown in block form a preferred embodiment of a mobile terminal which provides a simple and convenient status information confirmation service, according to the present invention.

As shown in FIG. 1, the mobile terminal, which is denoted by the reference numeral 100, comprises a communication unit 130 for performing a wireless communication function of the terminal. The communication unit 130 includes a radio frequency (RF) transmitter for up-converting the frequency of a signal to be transmitted and amplifying the resulting signal, and an RF receiver for low-noise amplifying a received signal and down-converting the frequency of the resulting signal.

A data processor 140 includes a modem for encoding and modulating a signal to be transmitted by the communication unit 130, and a codec for demodulating and decoding a signal received by the communication unit 130. The codec is provided with a data codec for processing packet data, etc., and an audio codec for processing an audio signal of voice, etc.

An audio processor 150 functions to reproduce a received audio signal outputted from the audio codec in the data processor 140 and outputs the reproduced audio signal through a speaker (not shown), or transfers an audio signal inputted from a microphone (not shown) to the audio codec in the data processor 140.

A controller 110 functions to control the entire operation of the mobile terminal. The controller 110 further functions to run an image capture program stored in a storage unit 160 to control a camera unit 180 so as to execute a camera function. The controller 110 further functions to run an operation program stored in the storage unit 160 in response to a command inputted from a key input unit 170. At this time, the controller 110 may change settings of an operation associated with the inputted command.

The camera unit 180 functions to capture an image of an object picked up through a lens (not shown). To this end, the camera unit 180 includes a camera sensor for converting an input optical signal into an electrical signal, and a signal processor for converting an analog image signal from the camera sensor into digital data. The camera sensor may be a charge coupled device (CCD) sensor and the signal processor may be a digital signal processor (DSP). The camera sensor and the signal processor may be configured integrally with each other or separately from each other. A display unit 190 functions to display an operation state of the mobile terminal.

The key input unit 170 preferably includes a Send key 171, a Menu key 172, numeric/character keys 173, a Move key 175, a Confirm key 176 and an End key 177. The Send key 171 is used to input a Send command, and the Menu key 172 is used to set information for the operation of the mobile terminal and confirm the set information. The numeric/character keys 173 are a plurality of keys which are provided to input numerals and characters. The Move key 175 is used to move or scroll a cursor to select menus displayed on the screen, i.e. display, of the mobile terminal, the Confirm key 176 is used to store settings of information displayed through the Menu key 172, and the End key 177 is used to end an operation being performed.

The storage unit 160 is adapted to store status information 162 of the mobile terminal according to the present embodiment, as well as existing programs necessary for the operation of the mobile terminal. The status information 162 contains information 164 set for the operation of the mobile terminal, and service use information 166 about records of services used by the mobile terminal.

The controller 110 is adapted to, if the Menu key 172 is pushed, detect service menus that the mobile terminal can detect from the storage unit 160 and display the detected menus via the display unit 190. Here, the menus displayable via the display unit 190 may be, for example, Mobile Phone Decoration, Internet Access, Phone Book, Electronic Diary, Internet Favorites, Message Receive/Send, Bell/Vibration Setting, Phone Management, Game, Music Service, and User Registration.

If the Phone Management menu, which is among the provided menus, is selected by moving the cursor thereto by means of the Move key 175 and pushing the Confirm key 176, the controller 110 detects menu items registered in the Phone Management menu from the storage unit 160 and displays the detected menu items via the display unit 190. Here, the menu items registered in the Phone Management menu may be, for example, Password Setting, Automatic Region Setting, Use Restriction, Screen Illumination Setting, Screen Brightness Setting, Subscriber Number Setting, Data Service Setting, Initialization, Phone Lock, and Phone Information. Here, for example, the Phone Information menu item is used to confirm status information of the mobile terminal or to confirm information set in the mobile terminal and service use information about records of services used by the mobile terminal.

In the case when the Phone Information menu item, which is among the menu items provided in the Phone Management menu displayed via the display unit 190, is selected, the controller 110 detects status information registered in the Phone Information menu item from the storage unit 160 and displays the detected status information via the display unit 190. If any one of the status information, or the set information or service use information, is selected through the key input unit 170, the controller 110 detects details of the selected status information from the storage unit 160 and displays the detected details via the display unit 190.

Therefore, all of the information set in the mobile terminal and all of the service use information are managed in one menu item in an integrated manner, thereby making it possible to more readily confirm the status information of the mobile terminal.

FIG. 2 is a table showing examples of status information settable in the mobile terminal of FIG. 1.

As shown in FIG. 2, the status information stored in the storage unit 160 according to the present embodiment may be, for example, a total call time, the present month's total call time, the number of messages in a sent message box, the number of messages in a received message box, the number of stored background pictures and a list of titles thereof, the number of stored melodies and a list of titles thereof, the number of input telephone numbers, the number of telephone numbers to be specially managed for call termination and a list thereof, the number of Karaoke rooms and a list of titles thereof, the number of contents downloaded into a land box, i.e. a kind of Korean download folder, and a list of titles thereof, the number of registered schedules and a list of titles thereof, the number of registered memos, an alarm setting, a bell/vibration setting, and a total memory capacity and currently used memory capacity.

All of the above information is stored in the storage unit 160 in the form of a table and for display in one service menu item. If any one of the displayed status information is selected, the controller 110 searches the table stored in the storage unit 160 for details of the selected status information and displays the searched details via the display unit 190.

Figure 3:
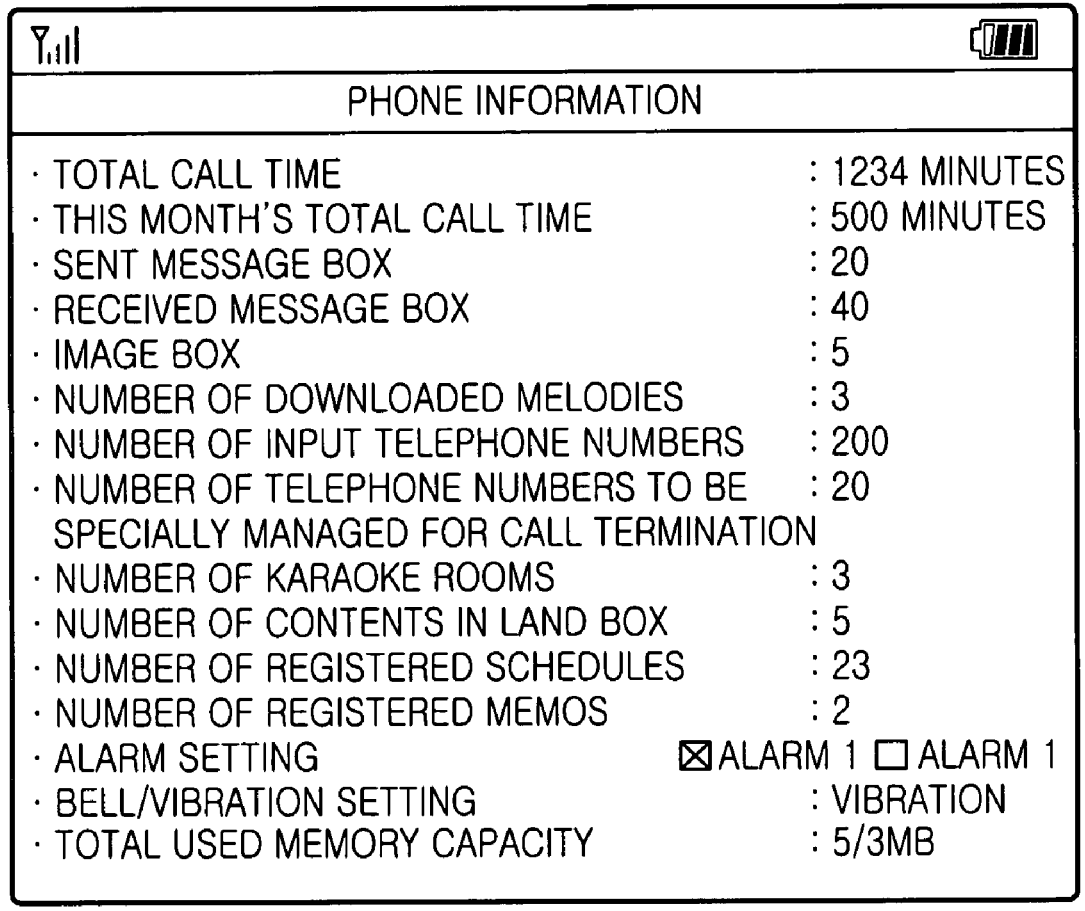
FIG. 3 is a view showing examples of display states of the status information shown in FIG. 2 on the screen of the mobile terminal.

FIG. 3 shows examples of a display of the status information shown in FIG. 2 on the screen of the mobile terminal. As shown in FIG. 3, if the Phone Information menu item is selected, the controller 110 displays all of the status information stored in the storage unit 160 via the display unit 190 at one time. As a result, the user can confirm the information set in the mobile terminal and the service use information about records of services used by the mobile terminal at a glance.

Figure 4:
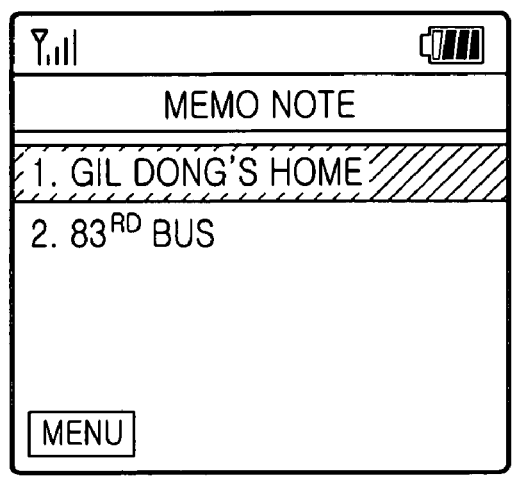
FIGS. 4 and 5 are views showing examples of information displayed on the screen of the mobile terminal as any one of the status information shown in FIG. 3 is selected.
Figure 5:
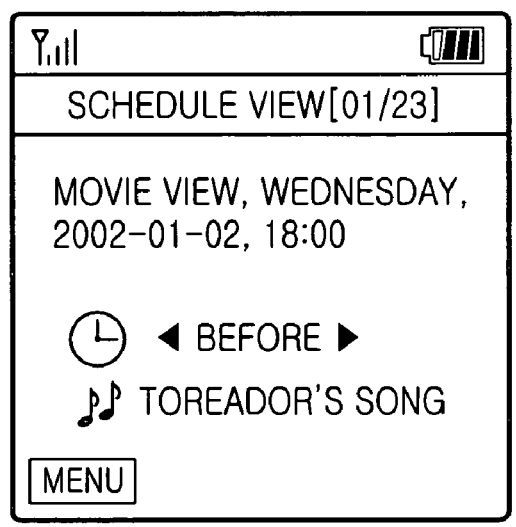

FIGS. 4 and 5 show examples of information displayed on the screen of the mobile terminal as any one of the status information shown in FIG. 3 is selected. In FIG. 4, if the display status information of "Number Of Registered Memos", which is among the status information shown in FIG. 3, is selected, the controller 110 detects a list of registered memos and details thereof from the storage unit 160 and displays them via the display unit 190.

In FIG. 5, if the display status information "Number Of Registered Schedules", which is among the status information shown in FIG. 3, is selected, the controller 110 detects a list of registered schedules and details thereof from the storage unit 160 and displays them via the display unit 190. The displayed contents can be modified or deleted by means of commands linked to a menu window displayed on the bottom of the screen. That is, if the selected status information is modifiable or can be deleted, the user can view corresponding command input menu items displayed by selecting the bottom menu window and modify or delete the status information by selecting a desired menu item.

Figure 6:
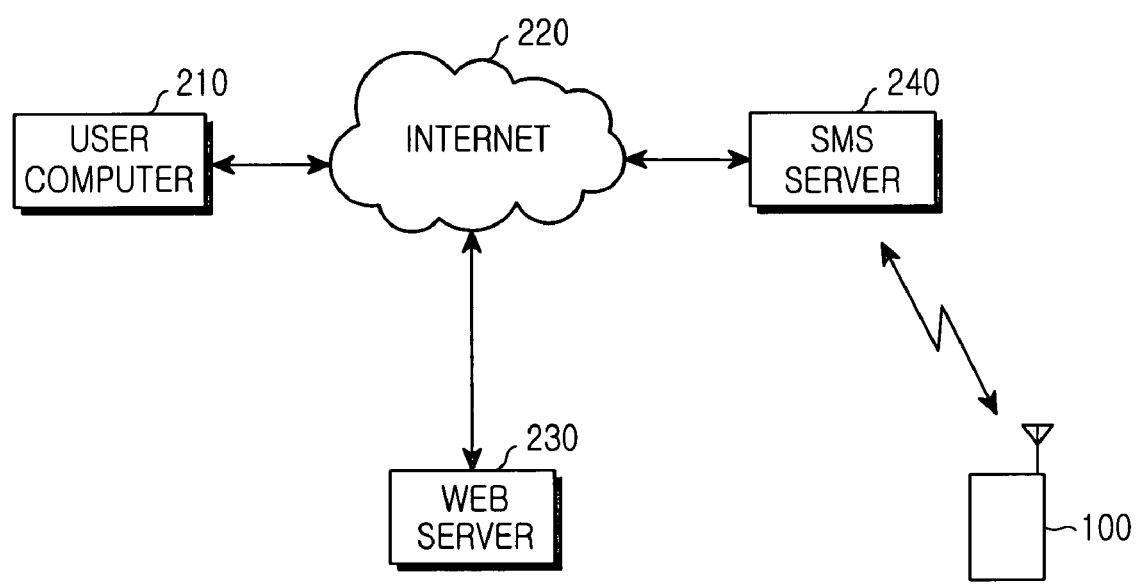
FIG. 6 is a block diagram showing a preferred embodiment of a system for providing status information of the mobile terminal on the Web, according to the present invention.

FIG. 6 is a block diagram showing a preferred embodiment of a system for providing status information of the mobile terminal on the Web, according to the present invention.

As shown in FIG. 6, a user computer 210 is connectable over the Internet 220 to a Web server 230, which provides a mobile communication service to the mobile terminal 100. Upon receipt of a command to request the status information of the mobile terminal 100 under the condition of being connected to the Web server 230 over the Internet 220, the user computer 210, i.e. the internet connected computer, sends a status information request signal to the Web server 230 over the Internet 220.

The Web server 230 determines the type of signal sent from the user computer 210. If the signal sent from the user computer 210 is determined to be a signal requesting status information of the mobile terminal 100, the Web server 230 transfers the status information request signal to an SMS server 240 over the Internet 220. The SMS server 240 creates an SMS message containing the status information request signal transferred from the Web server 230 and the created SMS message is transmitted to the mobile terminal 100 over a wireless network.

Upon receiving the SMS message with the status information request signal from the SMS server 240, the mobile terminal 100 detects status information corresponding to the status information request signal from the storage unit 160 and creates an SMS message containing the detected status information. The mobile terminal 100 then transmits the created SMS message containing the status information to the SMS server 240. At this time, the mobile terminal 100 preferably appends destination address information, or information about an address of the user computer 210, and information about a received time of the SMS message with the status information request signal to the SMS message with the status information, and transmits the resulting SMS message to the SMS server 240. The mobile terminal 100 may further append information about its remaining battery power to the SMS message to be transmitted to the SMS server 240.

The SMS server 240 converts the SMS message with the status information transmitted from the mobile terminal 100 into a status information signal and sends the converted signal to the Web server 230 over the Internet 220. The Web server 230 detects a destination address from the status information signal sent from the SMS server 240 and transfers the status information signal to the detected destination address. In the present embodiment, the destination address is the address of the user computer 210. As a result, the Web server 230 transfers the status information signal from the SMS server 240 to the user computer 210 over the Internet 220.

The user computer 210 receives the status information signal transferred from the Web server 230 and displays the corresponding status information of the mobile terminal 100 on the screen of the user computer 210.

In other words, the SMS server 240 receives the signal to request the status information of the mobile terminal 100, transferred over the Internet 220, converts the received status information request signal into an SMS message and transmits the converted SMS message to the mobile terminal 100. The mobile terminal 100 analyzes the SMS message transmitted from the SMS server 240 to detect status information corresponding to the status information request signal stored in the storage unit 160, converts the detected status information into an SMS message, and transmits the converted SMS message to the SMS server 240. The SMS server 240 converts the SMS message transmitted from the mobile terminal 100 into a status information signal and sends the converted status information signal to the user computer 210. Therefore, the user can readily confirm the status information of the mobile terminal even through an external communication device connected to the Internet.

FIG. 7 is a table showing examples of status information provided from the mobile terminal displayed on the screen of the user computer through the system of FIG. 6.

As shown in FIG. 7, the status information of the mobile terminal 100 displayed on the screen of the user computer 210 further includes information about a received time of a status information request message and information about the remaining battery power of the mobile terminal 100, in addition to the status information displayed on the screen of the mobile terminal 100, as described above in regard to FIG. 3.

This system makes it possible for the user to readily confirm the status information of the mobile terminal 100 when he/she is not carrying the mobile terminal 100 or has lost it. Namely, when the user is not carrying the mobile terminal 100, he/she can readily confirm the status information of the mobile terminal 100 through the present embodiment, although the terminal 100 may be used by another person.

As apparent from the above description, according to the present invention, status information of a mobile terminal containing information set in the mobile terminal and service use information is managed in one menu item in an integrated manner, so it can be more readily confirmed.

Further, an SMS server receives a signal to request the status information of the mobile terminal, transferred over the Internet, converts the received status information request signal into an SMS message and transmits the converted SMS message to the mobile terminal. The mobile terminal analyzes the SMS message transmitted from the SMS server, detects from a storage unit status information corresponding to the status information request signal, converts the detected status information into an SMS message, and transmits the converted SMS message to the SMS server. The SMS server converts the SMS message transmitted from the mobile terminal into a status information signal and sends the converted status information signal to a user computer. Therefore, a user can readily confirm the status information of the mobile terminal even through an external communication device connected to the Internet.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile terminal comprising:
    a storage unit for storing status information of the mobile terminal in a table, the status information including lists of status information having at least one item and detailed status information corresponding to respective items;
    a display unit for displaying the status information stored in the table together;
    a key input unit for inputting a command to display the status information; and
    a controller responsive to the status information display command inputted from the key input unit, for detecting the stored status information from the table and displaying all of the detected status information together on the display unit.

2. The mobile terminal as set forth in claim 1, wherein the status information includes at least one of information set for an operation of the mobile terminal and service use information about records of services used by the mobile terminal.

3. The mobile terminal as set forth in claim 2, wherein the set operation information includes a list and details of items set for the operation of the mobile terminal, and the service use information includes a list and details of service items used by the mobile terminal.

4. The mobile terminal as set forth in claim 3, wherein the controller is adapted to, if a signal to select any one item of the status information shared in the table is inputted from the key input unit, detect details of the selected status information item from the storage unit and display the details of the selected status item on the display unit.

5. A system for providing status information of a mobile terminal, comprising:
    an Internet connected computer generating a status information request signal in response to an input command to request the status information, sending the generated status information request signal over the Internet, receiving information corresponding to the status information request signal over the Internet and displaying the received information;
    the mobile terminal adapted for storing the status information and detecting and transmitting the status information in response to the status information request signal sent from the computer; and
    a Web server for transferring the status information request signal from the computer to the mobile terminal and the status information from the mobile terminal to the computer, respectively.

6. The system as set forth in claim 5, further comprising:
a short messaging service (SMS) server connected to the Internet, the SMS server receiving the status information request signal transferred from the Web server, creating a first SMS message including the received status information request signal and transmitting the first SMS message to the mobile terminal over a wireless network, wherein the mobile terminal is adapted to receive the first SMS message transmitted from the SMS server, detect the status information stored therein in response to the status information request signal included in the first SMS message, create a second SMS message including the detected status information and transmit the second SMS message to the SMS server, wherein the SMS server is adapted to receive the second SMS message including said the status information transmitted from the mobile terminal, convert the status information into a status information signal and send the converted status information signal to the Web server over the Internet, and wherein the Web server is adapted to transfer the status information signal sent from the SMS server to the computer over the Internet.

7. The system as set forth in claim 6, wherein the second SMS message including the status information transmitted from the mobile terminal further includes at least one of information about a received time of the first SMS message transmitted from the SMS server, information about remaining battery power of the mobile terminal and a destination address information of the second SMS message.

8. The system as set forth in claim 7, wherein the status information included in the second SMS message includes at least one of information set for an operation of the mobile terminal and service use information about records of services used by the mobile terminal.

9. The system as set forth in claim 8, wherein the set information included in the second SMS message includes a list and details of items set for the operation of the mobile terminal, and the service use information includes a list and details of service items used by the mobile terminal.

10. A method for providing status information of a mobile terminal, comprising:

generating, by an Internet connected computer, a status information request signal in response to an input command to request the status information, sending the generated status information request signal over the Internet, receiving information corresponding to the status information request signal over the Internet and displaying the received information;

storing, by the mobile terminal, the status information and detecting and transmitting the status information in response to the status information request signal sent from the computer; and transferring, by a Web server, the status information request signal from the computer to the mobile terminal and the status information from the mobile terminal to the computer, respectively.

\* \* \* \* \*